United States Patent [19]

Ohsawa

[11] Patent Number: 4,687,307

[45] Date of Patent: Aug. 18, 1987

[54] INFORMATION READ-IN DEVICE FOR CAMERA

[75] Inventor: Toshifumi Ohsawa, Kanagawa, Japan

[73] Assignee: Canon Kabushiki Kaisha, Tokyo, Japan

[21] Appl. No.: 862,182

[22] Filed: May 8, 1986

Related U.S. Application Data

[63] Continuation of Ser. No. 688,306, Jan. 2, 1985, abandoned.

[30] Foreign Application Priority Data

Jan. 6, 1984 [JP] Japan ................................. 59-596

[51] Int. Cl.[4] ............................ G03B 7/24; G03B 7/26
[52] U.S. Cl. ........................................ 354/21; 354/484
[58] Field of Search ................ 354/21, 484; 352/78 C

[56] References Cited

U.S. PATENT DOCUMENTS

| 4,309,089 | 1/1982 | Harvey | 354/21 |
| 4,437,742 | 3/1984 | Tanisuchi | 354/21 |
| 4,500,183 | 2/1985 | Tanikawa | 354/21 |
| 4,512,643 | 4/1985 | Tokuda | 354/21 |

Primary Examiner—W. B. Perkey
Attorney, Agent, or Firm—Toren, McGeady & Associates

[57] ABSTRACT

This invention relates to an information read-in device for reading in photographic informations from a film container or the like.

The invention has made it possible for the aforesaid type of read-in device to always accurately read in informations by carrying out the reading of photographic informations in a prescribed time from the closure of the back cover of the camera.

11 Claims, 5 Drawing Figures

INFORMATION READ-IN DEVICE FOR CAMERA

This is a continuation of application Ser. No. 688,306, filed Jan. 2, 1985, now abandoned.

BACKGROUND OF THE INVENTION

1. Field of the Invention

This is a continuation of application Ser. No. 688,306, filed Jan. 2, 1985, now abandoned.

This invention relates to a reading-in circuit for cameras equipped with means for reading photographic information codes recorded on the film cartridge or on the film surface.

2. Description of the Prior Art

In the art of cameras, it is known that photographic information such as film sensitivity, frame number and exposure range, recorded on the film cartridge or the film leader are read out and automatically set in the computation control curcuit as computation control information.

Of the cameras having automatic setting means of this kind, among others, one camera uses film cartridges having electrical contacts as the photographic information code when loaded to perform automatic setting of the aforesaid photographic information, if the code is read in when the back cover is not yet closed, since the contacts as unstable, erroneous reading are very possible.

To improve this, a method employed for initiating reading may be considered in which a switch detects when the back cover is fully closed after the film cartridge is loaded. Even in this case, due to vibrations occurring when the back cover is closed, just after the back cover is closed the contacts will become unstable, also producing some possibility of erroneous reading. On the other hand, with the film loaded, after a prescribed time from the closure of the back cover has passed, the contacts are established, assuming a condition suitable for code reading. Also, even if the information is read out when the contacts are stabilized, then, upon lapse of a subsequent long time, the interface between the contact and the information code area will produce erroneous electrical conductivity since dust build up and rust eats into the confronting surfaces. Therefore, even though accurate information readings were once attained, if the reading operation continues, erroneous information reading will possibly later accidentally occur.

An object of the present invention is to provide a read-in device in which after the film has been loaded in the camera and the back cover has been closed, when a prescribed time lapses, photographic information provided on film container or the film are read in, whereby it is possible to always carry out information reading with the contacts stabilized.

Another object of the invention is to provide a read-in device which has overcome the above-described drawbacks by reading in photographic information only for a prescribed time after the film has been loaded in the camera and after the back cover has been closed.

Other objects of the invention will become apparent from the following description of an embodiment thereof by reference to the accompanying drawings.

SUMMARY OF THE INVENTION

An information read-in device for a camera including a sensing circuit for sensing photographic information attached to a film container or the like and a read-in circuit for reading in the information sensed by the sensing circuit at a prescribed time after the back cover of the camera has been closed.

DESCRIPTION OF THE PREFERRED EMBODIMENT

A photographic information read-in device according to the present invention is described next.

Figure 1A:
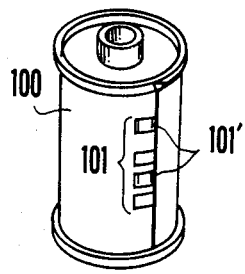
FIGS. 1(a) and 1(b) are perspective views of a film cartridge having a photographic code information area.
Figure 1B:
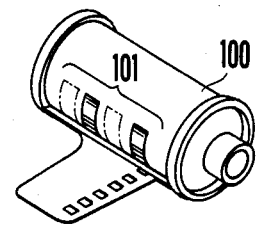
Figure 2A:
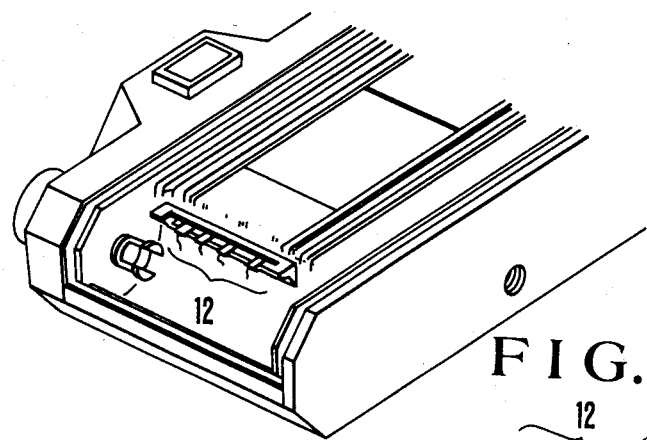
FIGS. 2(a) and 2(b) are, respectively, a perspective view of an example of a photographic information sensor in the camera body, which is to be loaded with the film cartridge of FIG. 1, and a perspective view of its main parts.
Figure 2B:
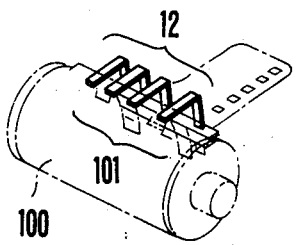

FIGS. 1(a) and 1(b) illustrate the outer appearance of a film cartridge having a photographic information code area usable with the device of the present invention. Reference numeral 100 a film cartridge, and Reference numeral 101 a photographic information code area. In this code area 101 there are mounted contacts 101' corresponding in number and location to the film sensitivity. FIGS. 2(a) and 2(b) in perspective views illustrate an example of the camera provided with the photographic information code read-in device according to the present invention. Information detecting contacts 12 upon engagement with the code contacts 101 of the aforesaid cartridge to 100 detect the code of the film cartridge 100.

Figure 3:
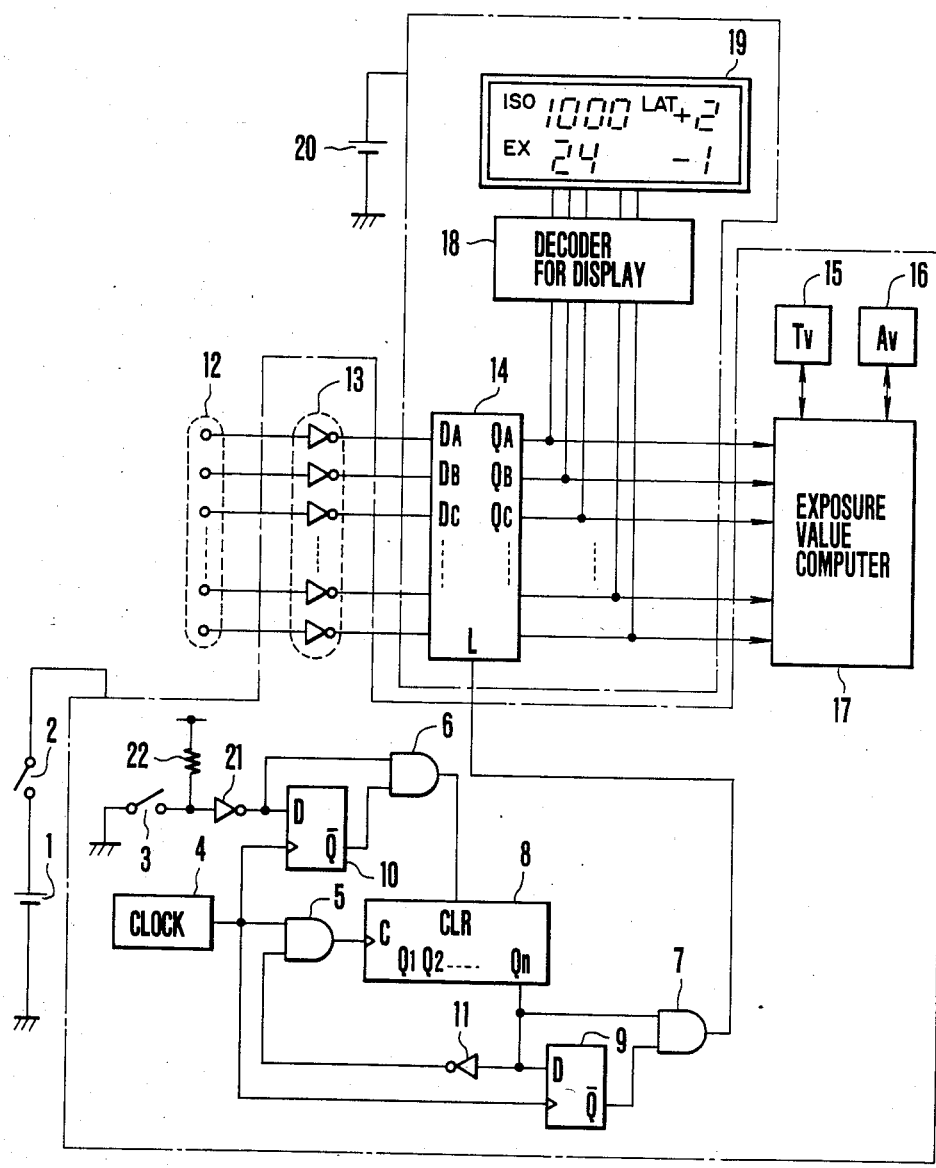
FIG. 3 is an electrical circuit diagram of an embodiment of a camera provided with a read-in device according to the present invention.

FIG. 3, in an electrical circuit diagram, illustrates an embodiment of a film information read-in device for a camera according to the present invention. In the figure, reference numeral 1 identifies an electrical power source or battery; 2 identifies a power switch. Another switch 3 is closed when the back cover of the camera is closed. An oscillator circuit 4 produces a train of clock pulses. Reference numerals 5,6 and 7 respectively identify AND gates; 8 an n-bit binary counter; 9 and 10 flip-flop circuits; 11 is an inverter gater. These parts, or the counter 8, then flip-flop circuits 9 and 10, the AND gates 5, 6 and 7 and the inverter 11 form a timer circuit. The information code read-out contacts 12 are positioned to engage the information code area 101 of the film cartridge 100. Reference numeral 13 identifies inverter gates; latch circtuits 14 form memory circuits for memorizing the code information; reference numeral 15 identifies a shutter speed setting circuit; 16 an aperture value setting circuit; 17 an exposure value computing circuit of the camera; 18 a decoder for display; 19 an information display device; 20 an electrical power source or battery for the back up of the latch circuits; 14 and 21 an inverter gate; 22 a pull-up resistor.

In the illustrated circuit, after the film has been loaded, when the back cover is closed, the switch 3 is closed whereby the potential at the D-terminal of the filp-flop 10 is changed to "1" level. In this case, however, because the $\overline{Q}$-terminal of the filp-flop 10 becomes "0" level in a time equal to one period of the clock signal of the oscillator circuit 4, the output of the AND gate 6 is maintained at "1" level for the time equal to one period of the clock signal. In other words, when the back is cover is closed, the one-shot circuit 10, 6 produces a pulse which is applied to a clear (CLR)-terminal of the binary counter 8, whereby its outputs Q1, Q2, . . . ,Qn are all reset to "0" level. As the Qn becomes "0" level, the output of the inverter 11 changes to "1" level so that the clock signal from the oscillator circuit 4 appears at the output of the AND gate 5. This is applied as an input signal to the binary counter 8. Thus, a counting operation is started.

The binary counter 8, responsive to the entrance of the $(2^{n-1})$th pulse, changes its output Qn from "0" to "1" level. By utilizing this, a waiting time from the closure of the back cover to the start of the information code recording is formed. Assuming that the oscillator circuit 4 has a clock frequency of 32,767 kHz, and the counter 8 has 11 stages (n=11), then it is in a time of 31.25 msec. from the advent of the clearing pulse that the Qn (in this instance, Q11) changes from "0" to "1". Responsive to this, the flip-flop 9 then changes its $\overline{Q}$ output from "1" to "0". Because, in this case too, the change of the output $\overline{Q}$ is delayed from the change of the input at the D-terminal by one period of the clock, the output of the AND gate 7 is maintained at "1" level for a time equal to one period of the clock.

Such a change of the output Qn also causes the output level of the inverter 11 to change to "0". Therefore, the output level of the AND gate 5 also becomes "0". Thus, the counting operation of the binary counter 8 is stopped.

The pulse from the second one-shot circuit 9, 7 is applied to the L-terminal of the latch circuit 14. The latch circuit 14 operates in such a manner that when the input at the L-terminal is "1" level, data is communicated from Dx directly to Qx (x=A, B, C, . . . ), and when of and "0" output level, the data Dx which occurred just before the change of the input at the L-terminal is held in the Qx.

In summary, after the camera is loaded with the film, when the back cover is closed, the contacts 12 engage the information code area 101 of the film cartridge 100. In the prescribed waiting time defined by the binary counter 8, the one-shot pulse as the information code read-in signal is applied to the L terminal of the latch circuit 14. The film information code applied to the individual Dx input terminals of the latch circuit 14 through the inverters 13 are placed on the respective individual Qx terminals, and are electrically held therein, from which the film information is later read in the exposure value computer 17.

The computing circuit 17 of the camera upon determining that exposure has occurred accesses the film information from the output terminals Qx of the latch circuit 14 to compute an exposure value, i.e. shutter time, or aperture size, which is given to the shutter speed setting circuit 15 or the aperture setting circuit 16. The outputs of the latch circuit 14 are also applied through the decoder 18 to the display device 19, either on the top panel of the camera housing or in the view finder field.

The back-up battery 20 is used for the purpose of allowing the latch circuit 14 and the photographic information display circuitr 19 to retain the photographic information as it was read even if the main battery is changed before the film is all exposed.

As has been described above, the use of a certain waiting time from the closure of the back cover to start the reading of the photographic information code provides the possibility of reducing the percentage of erroneous readings to a very low level, since reading is performed with the contacts 12 stabilized.

Also the thus-read out photographic information code is held in the electrical circuit (latch circuit 14). Therefore, when the information code is read in again, it is not from the contacts 12, but from the latch circuit 14 that the information code is supplied, thereby giving the advantage that a long time has passed since the back cover was closed, even when the contacts 12 are not sensitive due to the contamination with dust or the like, the correct information can be read in. Thus, determination of an incorrect exposure can be avoided. Furthermore, the circuit 14 for holding the photographic information is provided with the back-up battery 20 in order to insure that the photographic information is protected against change even when the main battery 1 retains no electrical energy or changed. This produces an added advantage of preventing erroneous photographic information from being read in the computer 17.

Though the embodiment has been described in conjunction with the mechanical contacts 12 from which the data is read out electrically, it is, of course, possible to apply the present invention to another type of device in which the data is read out photo-electrically or by using a so-called photo-coupler.

Also in the illustrated embodiment, the data take its place on the film container. But even for the data are located on the film surface, are present invention is applicable when, for example, the aforesaid photo-electrical readout means is used.

What is claimed is:

1. An information read-in device which reads in photographic information attached to a film container housed in a film container chamber of a camera by closing a cover of said chamber of the camera, comprising:
    (a) a sensing circuit for sensing said information attached to a film container;
    (b) a timer for counting a prescribed period of time after the closure of said cover; and
    (c) a read-in circuit for reading in the information from said sensing circuit after an elapse of such period of time as regulated by said timer.

2. An information read-in device which reads in photographic information attached to a film container housed in a film container chamber of a camera by closing a cover of said chamber of the camera, comprising:
    (a) an information detection circuit having sensing means for sensing said information attached to the film container and a read-in circuit for reading in the information from said sensing means; and
    (b) a timer for counting a prescribed period of time after the closure of said camera cover, wherein said information detection circuit functions after an elapse of such period of time as regulated by said timer for reading in the information.

3. An information read-in device which reads in photographic information attached to a film container housed in a film container chamber of a camera by closing a cover of said chamber of the camera, comprising:
    (a) a sensing circuit for sensing said information attached to the film container;
    (b) a timer for counting a prescribed period of time after the closure of said cover of the camera; and (c) a memory circuit for memorizing information from said sensing circuit after an elapse of such period of time as regulated by said timer.

4. A camera comprising:
(a) a chamber for housing a film container;
(b) a cover for closing said chamber;
(c) a sensing circuit for sensing photographic information attached to the film container housed in said chamber;
(d) a timer for counting a prescribed period of time after the closure of said cover; and
(e) a read-in circuit for reading in the information for said sensing circuit after an elapse of such period of time as regulated by said timer.

5. A camera comprising:
(a) a chamber for housing a film container;
(b) a cover for closing said chamber;
(c) an information detection circuit having sensing means for sensing photographic information attached to the film container housed in said chamber and a read-in circuit for reading in the information from said sensing means; and
(d) a timer for counting a prescribed period of time from the closure of said camera cover, wherein said information detection circuit functions after an elapse of such period of time as regulated by said timer for reading in the information.

6. A camera comprising:
(a) a chamber for housing a film container;
(b) a cover for closing said chamber;
(c) a sensing circuit for sensing photographic information attached to the film container housed in said chamber;
(d) a timer for counting a prescribed period of time from the closure of said camera cover; and
(e) a memory circuit for memorizing information from said sensing circuit after an elapse of such period of time as regulated by said timer.

7. An information read-in device according to claim 1 or a camera according to claim 4, wherein said read-in circuit executes a read-in operation for a prescribed period of time.

8. A camera according to claim 2 or a camera according to claim 5, wherein said information detection circuit functions for a prescribed period of time after an elapse of such period of time as regulated by said timer.

9. A camera comprising:
(a) a power supply circuit;
(b) a power switch for supplying a power to an exposure control circuit, whereby when said switch turns on, the power from said power supply circuit is supplied to said exposure control circuit;
(c) a sensing means for sensing photographic information attached to the film container;
(d) a memory circuit for memorizing the sensed photographic information provided on the film container;
(e) a control circuit for executing a memorizing operation by said memory circuit; and
(f) a back up power source for providing power to said memory circuit, said back up power source carrying out the power supply regardless of whether said power switch is on or off, thereby the content of the memory circuit is sustained.

10. A camera comprising:
(a) a power supply circuit for supplying a power to an exposure control circuit;
(b) sensing means for sensing photographic information attached to a film container;
(c) a memory circuit for memorizing the sensed photographic information provided on the film container;
(d) a control circuit for executing a memorizing operation by said memory circuit; and
(e) a back up power source for always supplying power to said memory circuit independently of said power supply circuit.

11. A camera according to claim 9 or 10, in which said control circuit executes a memorizing operation in response to closure of a back cover of the camera.

* * * * *

Adverse Decision in Interference

In Interference No. 102,335, involving Patent No. 4,687,307, T. Ohsawa, INFORMATION READ-IN DEVICE FOR CAMERA, final judgment adverse to the patentee was rendered June 26, 1990, as to claims 9-11.

*[Official Gazette August 28, 1990]*